United States Patent [19]

Long

[11] 4,267,294
[45] May 12, 1981

[54] 1-OLEFIN POLYMERIZATION CATALYST

[75] Inventor: Wendell P. Long, Wilmington, Del.

[73] Assignee: Hercules Incorporated, Wilmington, Del.

[21] Appl. No.: 104,929

[22] Filed: Dec. 18, 1979

[51] Int. Cl.$^3$ .......................... C08F 4/02; C08F 10/06
[52] U.S. Cl. ............................... 526/125; 252/429 B; 252/429 C; 526/153; 526/351
[58] Field of Search ................................ 526/125, 153

[56] References Cited

U.S. PATENT DOCUMENTS

| | | | |
|---|---|---|---|
| 2,954,367 | 9/1960 | Vandenberg | 526/153 |
| 3,789,036 | 1/1974 | Lonzi et al. | 526/125 |
| 4,143,223 | 3/1979 | Toyota et al. | 526/125 |
| 4,175,171 | 11/1979 | Ito et al. | 526/125 |
| 4,186,107 | 1/1980 | Wagner | 526/125 |

FOREIGN PATENT DOCUMENTS

| | | | |
|---|---|---|---|
| 2738200 | 3/1979 | Fed. Rep. of Germany | 526/119 |
| 5030983 | 3/1975 | Japan | 526/125 |
| 1373982 | 11/1974 | United Kingdom . | |

*Primary Examiner*—Edward J. Smith
*Attorney, Agent, or Firm*—John W. Whitson

[57] ABSTRACT

In the polymerization of 1-olefins using a solid catalyst component composed of a titanium halide deposited on an anhydrous, essentially magnesium halide support and an activator component composed of a trialkylaluminum and a lower alkyl ester of an aromatic carboxylic acid, the decay in activity of the catalyst is delayed by replacing a portion of the trialkylaluminum in the activator component with a dialkylaluminum hydride.

4 Claims, No Drawings

1-OLEFIN POLYMERIZATION CATALYST

This invention relates to the polymerization of 1-olefins using an improved catalyst. More particularly, it relates to an improved trialkylaluminum activator composition and the process of using it. This composition provides for less rapid decrease in the rate of polymerization when used as a catalyst component in the polymerization of 1-olefins. The productivity of the catalyst is correspondingly increased.

As is well known in the art, effective catalysts for the polymerization of 1-olefins are the Ziegler-Natta catalysts obtained by combining transition metal compounds of Groups IVb to VIb of the periodic table with organometallic compounds of Groups I to III of the table. It also is known that these catalysts can be made more effective by depositing the transition metal component on an inorganic compound as a support. Essentially anhydrous magnesium halides, $MgX_2$, wherein X is a chlorine or bromine atom, are preferred support materials. Nevertheless, the resulting catalysts have not been completely satisfactory due to the fact that their initially high activity decreases appreciably over a comparatively short period of time. The activity of the catalyst is said to decay.

Now, in accordance with this invention, it has been found that, in a process of polymerizing 1-olefins using a solid catalyst component composed of a titanium halide deposited on an anhydrous, essentially magnesium halide support and an activator component composed of a trialkylaluminum and a lower alkyl ester of an aromatic carboxylic acid, the decay in activity of the catalyst can be considerably delayed by replacing a portion of the trialkylaluminum with a dialkylaluminum hydride. For example, the replacement, on a molar basis, of one-half of the trialkylaluminum with a dialkylaluminum hydride in the activator composition has increased the time to reach 50% of the initial rate of polymerization by a factor of more than two and has increased the additional time in going from 50% to 25% of the initial rate by a factor of more than four.

Having generally described the embodiments of this invention, the following examples constitute specific illustrations thereof. All amounts are as given in the examples.

EXAMPLES 1 AND 2

Support Preparation

Under an atmosphere of argon throughout the reaction, a flask was charged with 30 mmols of diisoamyl ether (DIAE) and 60 mmols of dibutylmagnesium, and hexane was added to a total volume of approximately 120 ml. The flask was cooled to $-65°$ C. and 180 mmols of ethylaluminum dichloride was added dropwise over two hours with stirring at a speed of 250 r.p.m. The final volume was approximately 225 ml. The mixture was stirred an additional hour at $-65°$ C., then allowed to warm to room temperature over one-half hour and stirred for another hour. The supernatent liquor was decanted, and the support was washed five times with 100-ml. portions of fresh hexane. The solid was resuspended in hexane to a total volume of about 150 ml. [Anal.: 0.36 M Mg; 0.085 M Al; 1.15 M Cl.]

Catalyst Preparation

Under an atmosphere of argon, the above slurry of magnesium chloride particles in hexane was treated with 47.4 mmols of DIAE (ratio of ether/Mg about 0.9) for one hour at room temperature. The liquor was decanted, and the solid was washed three times with 100-ml. portions of hexane; the solid was then resuspended in 150 ml. of fresh hexane. To this slurry, 1.44 mmols of ethyl benzoate was added, and the mixture was stirred at room temperature for one hour, following which 2.88 mmols $TiCl_4$ was added and the resulting mixture was stirred at 35° C. for another hour. An additional 47.4 mmols of DIAE was then added and the mixture was stirred another hour at 35° C. After decantation of liquid, the solid was washed three times with 100-ml. portions of hexane and resuspended to a volume of 360 ml. [Anal.: 0.0038 M Ti; 0.139 M Mg; 0.272 M Cl; 0.001 M Al; thus providing for 2.66 mol % Ti (based on Mg) and a Cl/Mg ratio of 1.95].

Polymerization of Propylene

Polymerizations were conducted in magnetically stirred vessels of 800 milliliters volume. The vessels were charged with 400 ml. of purified hexane, which was free of air and water, under argon. The values given in the first three columns of Table I are the millimoles of reagents added to the vessel at room temperature. The argon was replaced by propylene, and the solid catalyst was injected by syringe as a slurry in hexane. [The amount of Ti listed in the fourth column of Table I is calculated from the analysis of the polypropylene product for p.p.m. Ti]. After approximately five minutes, the temperature of the vessel was raised to 60° C., and the total pressure was increased to 38 p.s.i.g. (hexane vapor as well as propylene). Rate of monomer consumption was measured as a function of time, where zero time was taken as the time of opening the vessels to 38 p.s.i.g. upon reaching 60° C. The first value in Table I for decay in rate gives the time in minutes for the rate to drop from the value measured initially at 60° C. to one half of that rate. The second value gives the time required to drop an additional one half, i.e., from 50% down to 25% of the initial rate.

The remaining information pertaining to the above polymerizations also is shown in Table I. In this table, as well as in Table II to follow, the following definitions apply: EtOBz=ethyl benzoate; Total hr.=total polymerization time in hours; Insol. g.=grams of polypropylene product insoluble in the hexane solvent; Sol. g.=grams of polypropylene product soluble in the hexane solvent; p.p.m. Ti=parts per million of titanium in the polypropylene product as determined by analysis; Insol. g./mmol Ti=the mileage, i.e., the number of grams of the polypropylene product insoluble in the hexane solvent per millimole of titanium; and "Z"=the average rate, expressed in grams of diluent insoluble polypropylene product, at which the product is produced per millimole of titanium per atmosphere of propylene per hour.

TABLE I

| Example 1 | Part A | | | |
|---|---|---|---|---|
| | $Et_3Al$ | $Et_2AlH$ | EtOBz | Ti (mmols) |
| (a) | 0.32 | 0 | 0.10 | .0039 |

TABLE I-continued

|  | | | | |
|---|---|---|---|---|
| (b) | 0.24 | 0.08 | 0.10 | .0044 |
| (c) | 0.16 | 0.16 | 0.10 | .0051 |
| (d) | 0.08 | 0.24 | 0.10 | .0075 |
| (e) | 0 | 0.32 | 0.10 | .0043 |

Example 2

|  | iBu$_3$Al | iBu$_2$AlH | EtOBz | Ti (mmols) |
|---|---|---|---|---|
| (a) | 0.32 | 0 | 0.10 | .0045 |
| (b) | 0.24 | 0.08 | 0.10 | .0054 |
| (c) | 0.16 | 0.16 | 0.10 | .0052 |
| (d) | 0 | 0.32 | 0.10 | .0076 |

Part B

Example 1

|  | Time to decay to 50%, then to 25% | | Total hr. | Insol. g. | Sol. g. | % Polymer sol. in hexane | p.p.m. Ti | Insol. g./mmol Ti | "Z" |
|---|---|---|---|---|---|---|---|---|---|
| (a) | 26 min. | 26 min. | 2.6 | 20.9 | 0.5 | 2.4 | 9 | 5320 | 620 |
| (b) | 28 min. | ~120 min. | 2.6 | 30.4 | 1.1 | 3.5 | 7 | 6840 | 800 |
| (c) | 60 min. | >100 min. | 2.6 | 40.8 | 4.8 | 4.9 | 6 | 8000 | 1020 |
| (d) | 50 min. | >100 min. | 3.1 | 72.0 | 32.9 | 31 | 5 | 9600 | 1040 |
| (e) | >100 min. | | 2.6 | 51.5 | 23.1 | 31 | 4 | 12000 | 1530 |

Example 2

|  | Time to decay to 50%, then to 25% | | Total hr. | Insol. g. | Sol. g. | % Polymer sol. in hexane | p.p.m. Ti | Insol. g./mmol Ti | "Z" |
|---|---|---|---|---|---|---|---|---|---|
| (a) | 20 min. | 20 min. | 2.4 | 11.9 | 0.2 | 1.8 | 18 | 2660 | 360 |
| (b) | 45 min. | (45) min. | 2.4 | 19.8 | 0.7 | 3.5 | 13 | 3680 | 500 |
| (c) | ~level | | 2.4 | 24.8 | 10.5 | 30 | 10 | 4800 | 650 |
| (d) | ~level | | 2.4 | 51.9 | 37.2 | 42 | 7 | 6840 | 940 |

EXAMPLES 3 AND 4

Support Preparation

Under an atmosphere of argon throughout the reaction and using hexane as the solvent, a flask was charged with 240 mmols of DIAE and 480 mmols dibutylmagnesium; the contents were stirred at room temperature for one-half hour at a speed of 150 r.p.m. and then were cooled to −65° C. over 15 minutes. With agitation at 250 r.p.m., 1.44 mols of ethylaluminum dichloride was added over two hours (Al/Mg ratio=3, final volume about 1500 milliliters). Stirring was continued at −65° C. for another one-half hour before the flask was warmed to room temperature over one hour and stirring was continued for another one-half hour. The liquor was decanted and the solids were washed six times with 375-ml. portions of hexane. The solid was resuspended in 1200 ml. of hexane. [Anal.: 0.436 M Mg; 0.070 M Al; 0.879 M Cl].

Catalyst Preparation

Under an atmosphere of argon, the above slurry of magnesium chloride particles in hexane was treated for one hour at room temperature with 190 mmols of DIAE (ratio of ether/Mg about 0.40). The liquor was decanted; the solid was washed three times with 375-ml. portions of hexane and was resuspended in fresh hexane to a volume of 1200 ml. The resulting slurry was treated with 11.52 mmols ethyl benzoate for one hour at room temperature followed by 23.04 mmols of TiCl$_4$ for one hour at 35° C. and then 190 mmols of DIAE for another hour at room temperature. The liquor was decanted; the solid was washed three times with 375-ml. portions of hexane and was resuspended to a volume of 600 ml. [Anal.: 0.0159 M Ti; 0.463 M Mg; 0.005 M Al; 1.01 M Cl; thus providing for 3.32 mol % Ti (based on Mg) and a Cl/Mg ratio of 2.18].

Polymerization of Propylene

The polymerizations of these examples were conducted following the procedure used in Examples 1 and 2. The data pertinent to the present examples are given in Table II.

TABLE II

Part A

Example 3

|  | Et$_3$Al | iBu$_2$AlH | EtOBz | Ti (mmols) |
|---|---|---|---|---|
| (a) | 0.32 | 0 | 0.10 | .0054 |
| (b) | 0.24 | 0.08 | 0.10 | .0060 |
| (c) | 0.16 | 0.16 | 0.10 | .0079 |

Example 4

|  | Et$_3$Al | Et$_2$AlH | EtOBz | Ti (mmols) |
|---|---|---|---|---|
| (a) | 0.64 | 0.64 | 0.40 | .0065 |
| (b) | 0.32 | 0.32 | 0.20 | .0068 |
| (c) | 0.16 | 0.16 | 0.10 | .0078 |
| (d) | 0.08 | 0.08 | 0.050 | .0069 |
| (e) | 0.04 | 0.04 | 0.025 | .0065 |

Part B

Example 3

Time to decay    Total    Insol.    Sol.    % Polymer    p.p.m.    Insol.

TABLE II-continued

|     | to 50%, then to 25% |          | hr. | g.   | g.   | sol. in hexane | Ti | g./mmol Ti | "Z" |
|-----|---------------------|----------|-----|------|------|----------------|----|------------|-----|
| (a) | 40 min.             | 40 min.  | 3.1 | 28.6 | 0.6  | 2.0            | 9  | 5320       | 570 |
| (b) | 40 min.             | 70 min.  | 3.3 | 41.2 | 1.2  | 2.8            | 7  | 6840       | 680 |
| (c) | 65 min.             | 70 min.  | 3.9 | 63.3 | 10.7 | 14.5           | 6  | 8000       | 690 |

Example 4

|     | Time to decay to 50%, then to 25% |           | Total hr. | Insol. g. | Sol. g. | % Polymer sol. in hexane | p.p.m. Ti | Insol. g./mmol Ti | "Z" |
|-----|-----------------------------------|-----------|-----------|-----------|---------|--------------------------|-----------|-------------------|-----|
| (a) | 75 min.                           | ~100 min. | 3.1       | 51.9      | 4.3     | 7.7                      | 6         | 8000              | 870 |
| (b) | 70 min.                           | ~100 min. | 3.1       | 54.0      | 4.2     | 7.2                      | 6         | 8000              | 870 |
| (c) | 80 min.                           | ~100 min. | 4.3       | 74.6      | 7.1     | 8.6                      | 5         | 9600              | 740 |
| (d) | 65 min.                           | 65 min.   | 3.1       | 41.1      | 5.1     | 11.1                     | 8         | 6000              | 650 |
| (e) | 105 min                           | 100 min.  | 3.1       | 34.7      | 5.0     | 12.5                     | 9         | 5300              | 580 |

The improved activator component of the Ziegler-Natta catalyst system used in the polymerization of 1-olefins in accordance with this invention is composed of a trialkylaluminum, a dialkylaluminum hydride and a lower alkyl ester of an aromatic carboxylic acid. Each of these is a necessary ingredient, and the amounts thereof relative to each other are very important in obtaining the desired polypropylene products.

In general the trialkylaluminums used in accordance with this invention are those trialkylaluminums in which each alkyl group contains from two to ten carbon atoms. Representative compounds are triethylaluminum, tri-n-propylaluminum, triisopropylaluminum, tri-n-butylaluminum, triisobutylaluminum, tri-n-hexylaluminum, triisohexylaluminum, tri-n-decylaluminum and mixtures thereof.

The dialkylaluminum hydrides used in the activator component in accordance with this invention are the corresponding hydride compounds, such as diethylaluminum hydride, diisobutylaluminum hydride, di-n-octylaluminum hydride and di-n-decylaluminum hydride. Mixtures of the hydrides also may be used, and it is not necessary that the dialkylaluminum hydride correspond in the alkyl groups to the trialkylaluminum compound.

The lower alkyl ($C_1$14 $C_4$) esters of aromatic carboxylic acids used in the activator component of this invention are those lower alkyl esters of aromatic carboxylic acids wherein the esters contain a total of eight to sixteen carbon atoms. Exemplary esters are methyl benzoate, ethyl benzoate, isobutyl benzoate, ethyl p-anisate, ethyl p-toluate, dibutyl phthalate, ethyl salicylate, methyl m-chlorobenzoate, methyl o-fluorobenzoate and mixtures thereof. Althought not specifically shown in the examples, the p-anisate and p-toluate esters are somewhat preferred to the benzoate esters in that the former generally provide a smaller amount of diluent soluble polymer in the polymer product.

The mole ratio of trialkylaluminum ($R_3Al$) to dialkylaluminum hydride ($R_2AlH$) to the ester in the activator component used in accordance with this invention is very important. More specifically, the mole ratio of total aluminum ($R_3Al+R_2AlH$) to ester should be at least 3:1 and no more than 4:1, and preferably is from about 3.2:1 to about 3.5:1. When this ratio is as low as 2.5:1, for example, the yield of polymer is low and, when the ratio reaches 4:1, the proportion of the polymer product that is diluent soluble may be as much as 30% of the total polymer produced. Also, the mole ratio of $R_2AlH$ to ester preferably should not exceed about 1.5:1, the remaining portion of the total aluminum being contributed by $R_3Al$, since, as the ratio of $R_2AlH$ to ester increases, the amount of polymer product increases, but the proportion of this product which is diluent soluble also increases. For example, at a ratio of about 2:1, the product may contain as much as 30% of diluent-soluble polymer. Thus, the preferred mole ratio of $R_2AlH$ to ester is in the range of from about 0.5:1 to about 1.5:1.

In contrast to the criticality shown above, the data of Example 4 show that the productivity of polymer is not strongly dependent upon the amount of the activator component relative to the amount of titanium on the support. More specifically, the amount of total aluminum used relative to the amount of titanium present may be varied over a wide range as long as the amount is sufficient to remove any impurities, such as oxygen, and yet have enough to activate the catalyst, and an excessive amount is not deleterious as long as the ratios for total aluminum and $R_2AlH$ relative to the ester are maintained, as previously described.

Relative to the solid catalyst component which is used in accordance with this invention, it is composed of a titanium halide deposited on ahydrous, essentially magnesium halide support particles, and the preparation of representative catalyst components has been shown in the examples. However, other methods of preparing the magnesium halide support particles may be used and are known in the art. Also known in the art are procedures for depositing the titanium halide on solid supports.

The titanium halides preferably used in accordance with this invention are, for example, titanium tetrachloride, methoxytitanium trichloride, titanium tetrabromide and titanium tetraiodide. More generally, the titanium halides may be characterized by the formula $TiX_n(OR)_{4-n}$, wherein R is a $C_1$-$C_{20}$ alkyl group, X is a chlorine, bromine or iodine atom and n is 1, 2, 3 or 4. Titanium tetrachloride is preferred. The amount of the tetravalent titanium halide added to the support is preferably such that the magnesium to titanium mole ratio is in the range of from about 200:1 to about 1:1, more preferably from about 80:1 to about 5:1.

In conjunction with depositing the titanium halide on the magnesium halide support, it may be desirable to treat the support particles with an electron donor, more specifically, a lower alkyl ester of an aromatic carboxylic acid wherein the ester contains a total of eight to sixteen carbon atoms, such as ethyl benzoate. This particular group of electron donor compounds exhibits the effect of increasing the stereospecificity of the titanium halide in the production of polypropylene. However, excessive amounts of these esters have an adverse effect on the activity of the titanium catalyst, and the amount of the ester must be controlled in order that the titanium to ester mole ratio lies in the range of from about 0.5:1 to about 10:1, preferably from about 2:1 to about 4:1.

Both the ester treatment of the support particles and the deposition of the titanium halide on the support may be carried out at a temperature of from about 0° to about 100° C., preferably from about 15° to about 60° C., for a period of from about 0.25 hour to about two hours. Following deposition of the titanium halide on the support, the support particles are washed with hydrocarbon.

After treatment with the titanium halide, the support particles also may be further treated with an electron donor, preferably an aliphatic ether containing four to twenty-four carbon atoms, such as diethyl ether, dissopropylether, dibutyl ether, diisoamyl ether, dihexyl ether and dioctyl ether. The amount of ether used may be from about 1:10 to about 5:1, preferably from about 1:5 to about 1:1, on a molar basis relative to the amount of magnesium present. The ether treatment may be carried at a temperature of from about 20° to about 50° C. for about 0.25 to about one hour. The supported catalyst particles are then thoroughly washed with hydrocarbon and resuspended in hydrocarbon for use in the polymerization of 1-olefins.

The hydrocarbons used in the processing steps shown in the examples may be $C_5$–$C_{12}$ aliphatic hydrocarbons, $C_5$–$C_{12}$ cycloaliphatic hydrocarbons, $C_6$–$C_{12}$ monocyclic aromatic hydrocarbons or mixtures of any of these hydrocarbons. The preferred hydrocarbons are the $C_5$–$C_{12}$ aliphatic hydrocarbons and the $C_6$–$C_{12}$ monocyclic aromatic hydrocarbons. Representative of the aliphatic hydrocarbons are pentane, hexane, heptane and octane. Representative of the cycloaliphatic hydrocarbons are cyclopentane and cyclohexane, and exemplary of the aromatic hydrocarbons are benzene, toluene and xylene.

The 1-olefins which may be polymerized in accordance with this invention are well known. In addition to the propylene shown in the examples, other representative olefins are ethylene, 1-butene, 4-methyl-pentene-1 and 1-hexane. Mixtures of the 1-olefins also may be utilized. The polymerization of these olefins is improved in accordance with this invention in that the activity of the catalyst does not decrease as rapidly or to as great an extent as it does when the activator component is composed only of a trialkylaluminum and a lower alkyl ester of an aromatic carboxylic acid.

With regard to the latter activator component, each of Examples 1 to 3 shows that an activator composed only of $R_3Al$ and ester in a mole ratio of 3.2:1 results in a rate of polymerization which drops off 50% from the initial peak rate within 20 to 40 minutes and then drops off to 25% of the initial peak rate in another 20 to 40 minutes. Subsequently, the rate of polymerization usually tails off to a level, long-continued rate which generally is in the range of about 10 to about 15% of the initial peak rate. The same overall effect is observed when the mole ratio of $R_3Al$ to ester is 3.5:1.

When the mole ratio of $R_3Al$ to ester is less than 3:1, the rate of polymerization usually drops off sharply to zero after reaching the 25% level. This also can happen, even when the mole ratio of $R_3Al$ to ester is greater than 3:1, if sufficient impurities, especially oxygen, are present to decrease the original mole ratio to a lower value.

By comparison, when the activator component is composed of a trialkylaluminum, a dialkylaluminum hydride and a lower alkyl ester of an aromatic carboxylic acid in the proportions previously described, the rate of polymerization drops off much more slowly than when the dialkylaluminum hydride is not present. This is shown in Examples 1 to 3 in those runs wherein the ratios of trialkylaluminum to dialkylaluminum hydride to ester were 2.4:0.8:1 and 1.6:1.6:1. Moreover, it is to be noted in some cases that the decrease in rate of polymerization was sufficiently delayed that the rate did not descend to the 25% level but instead tended to become essentially a continuing, level rate at as much as 40% of the initial rate. This is shown in Example 2, where the term "level" is used, and in Example 1, where an especially long time (greater than 100 minutes) for the drop from 50% to 25% of the initial rate was involved. Clearly, the improvement in accordance with this invention enables greater productivity of polymer product per unit of titanium catalyst.

What I claim and desire to protect by Letters Patent is:

1. In a process for the polymerization of 1-olefins containing a least three carbon atoms in the presence of a solid catalyst component composed of a titanium halide deposited on an anhydrous, essentially magnesium halide support and an activator component composed of a trialkylaluminum and a lower alkyl ester of an aromatic carboxylic acid, said ester containing from eight to sixteen carbon atoms, the improvement which comprises substituting a dialkylaluminum hydride for a portion of the trialkylaluminum in the activator, such substitution being made so as to provide a mole ratio of total aluminum to ester of from 3:1 to 4:1 and a mole ratio of dialkylaluminum hydride to ester of from about 0.5:1 to about 1.5:1.

2. The process of claim 1 wherein the mole ratio of total aluminum to ester is from about 3.2:1 to about 3.5:1.

3. The process of claim 2 wherein the trialkylaluminum is triethylaluminum or triisobutylaluminum and the dialkylaluminum hydride is diethylaluminum hydride or diisobutylaluminum hydride.

4. The process of claim 3 wherein the ester is ethyl benzoate, ethyl p-anisate or ethyl p-toluate.

* * * * *